United States Patent [19]
Alvarez

[11] Patent Number: 6,039,408
[45] Date of Patent: Mar. 21, 2000

[54] BREAK-AWAY LUG NUT POSITIONER

[76] Inventor: William Alvarez, 917 Sam Hunt Rd., Fairmont, Ga. 30139

[21] Appl. No.: 09/184,916

[22] Filed: Nov. 2, 1998

Related U.S. Application Data

[60] Provisional application No. 60/064,084, Nov. 3, 1997.
[51] Int. Cl.$^7$ ..................................................... B60B 23/00
[52] U.S. Cl. ........................ 301/111; 301/35.62; 411/258; 411/432; 411/930; 411/544
[58] Field of Search ................................ 301/35.62, 111; 411/9, 10, 11, 258, 171, 544, 542, 432, 930

[56] References Cited

U.S. PATENT DOCUMENTS

| | | | |
|---|---|---|---|
| 3,386,771 | 6/1968 | Verdier et al. | 301/35.62 |
| 3,829,163 | 8/1974 | Hans | 301/111 |
| 5,042,880 | 8/1991 | Garuti et al. | 301/111 |
| 5,209,623 | 5/1993 | Krehnovi | 411/432 |
| 5,452,944 | 9/1995 | Bear | 411/544 |
| 5,542,753 | 8/1996 | Plumer | 411/544 |
| 5,711,581 | 1/1998 | Plumer | 411/544 |

*Primary Examiner*—S. Joseph Morano
*Assistant Examiner*—Long Bao Nguyen
*Attorney, Agent, or Firm*—Morris, Manning & Martin, LLP

[57] ABSTRACT

A break-away lug nut positioner for holding lug nuts on a race car wheel to facilitate more rapid tire changes during pit stops. The break-away lug nut positioner includes a spacer that supports a lug nut at a proper distance over a mounting hole of a race car wheel. That is, the spacer holds the lug nut so that it is adjacent to a threaded mounting stud when the wheel is held flush against the race car hub. During installation, the lug nut is driven into the spacer cavity, forcing the spacer to break into pieces. The adhesive bond between the lug nut and the spacer is weaker than the individual pieces of the spacer, which causes the spacer to separate cleanly from the lug nut, allowing the lug nut to seat properly against the wheel mounting plate. That is, the adhesive and the material and configuration of the spacer are selected so that the spacer breaks cleanly away from the lug nut, and no spacer material remains between the lug nut and the mounting plate.

27 Claims, 5 Drawing Sheets

BREAK-AWAY LUG NUT POSITIONER

This application claims benefit of Provisional Appl. 60/064,084 filed Nov. 3, 1997.

TECHNICAL FIELD

This invention relates to automotive vehicles and, more particularly, relates to a break-away lug nut positioner for holding lug nuts on a race car wheel to facilitate rapid tire changes during pit stops.

BACKGROUND OF THE INVENTION

In modern day automobile racing, such as Winston Cup NASCAR and other types of racing, the automobiles are required to make a number of pit stops for refueling, tire changes, equipment adjustments, and the like. In certain fields of racing, like Winston Cup Racing, a race car must make an average of eight pit stops per 500 mile race. The wear and tear on the racing tires, which are soft rubber for high traction, mandates frequent tire replacement.

The time required to change tires and conduct other service in a pit stop can be critical to winning or losing a race. For example, a recent race event involved a loss of place from first to thirteenth for a well-known race driver because of the loss of approximately two seconds while in a pit stop. Time losses of mere seconds are especially critical during "green flag" pit stops, which are any pit stops that are necessary when the race is under the green flag and the cars are permitted to pass one another.

One particular problem with changing tires is the handling of the lug nuts that hold the wheels on the car. Pit crews typically prepare a number of wheels with fresh tires and have them on standby for pit stops. In order to minimize the time delay resulting from handling the lug nuts, it is known in the art to employ a bead of adhesive to hold each lug nut in position on the wheel. The wheel with five pre-glued lug nuts is placed onto the five threaded hub studs, which protrude through the wheel mounting holes in the wheel mounting plate. An air wrench is then used to tighten the lug nuts, one at a time, until the wheel is secured to the hub of the race car.

When the pit crewman tightens the lug nuts, one of the five lug nuts must necessarily be tightened first. As the first lug nut is tightened, the wheel is pulled into position on the hub studs. The remaining studs then exert pressure on the remaining lug nuts and often cause the glue bead to fail and pop off a lug nut.

If a lug nut pops off during the tightening process, the crewman must manually retrieve the nut or get another nut from his pocket or another nearby location, and manually put it into the air wrench or manually begin to thread it onto the lug stud. In either case, valuable time is lost. Even a time loss of a few seconds during a green flag pit stop can mean the difference between winning or losing the race.

Accordingly there is a need for a faster way to fasten lug nuts onto race car wheels.

SUMMARY OF THE INVENTION

The present invention provides a solution to the problem of positioning lug nuts for more rapid tire changing during pit stops. A break-away lug nut positioner holds a lug nut in a spaced-apart position on a mounting plate of a race car wheel. Specifically, the spacer holds the lug nut so that it is positioned adjacent to an associated mounting stud when the wheel mounting plate is held flush against the hub. As a result, each lug nut is positioned for immediate installation, yet held far enough way from its stud such that tightening a first lug nut does not result in pressure on the other lug nuts from the remaining mounting studs.

Before a race, the crewman prepares the replacement tires by attaching a break-away lug-nut positioner, with an associated lug nut, over each mounting hole of each replacement wheel carrying an fresh tire. When a tire is subsequently changed during a pit stop, the replacement wheel with five break-away lug-nut positioners, supporting associated lug nuts, is placed onto the hub. Each threaded mounting studs protrudes into a lug-nut positioner to a point adjacent to a corresponding lug nut. The crewman then applies the air wrench to each lug nut. As a given lug nut is tightened with the air wrench, the other lug nut remain in position adjacent a corresponding stud. The crew man can then successively tighten the remaining lug nuts without risk that one or more of the lug nuts will pop off.

The lug nut may be attached to the spacer with a layer of adhesive. This adhesive is typically applied to a beveled edge of the spacer, which matches the bevel of the leading edge of the lug nut. A spacer with an attached lug nut is then fastened over each mounting hole of a race car wheel mounting plate, typically with an adhesive applied between the spacer and the wheel mounting plate. The lug nut may be alternatively be attached to the spacer with another type of fastener, such as plastic wrap or tape, which may be used alone or in combination with the adhesive. In addition, the spacer may alternatively be attached to the wheel mounting plate using a groove or clip in the wheel mounting plate, or another suitable type of fastener.

During installation, the lug nut is driven into the spacer cavity, forcing the spacer to break into pieces. The adhesive bond between the lug nut and the spacer is weaker than the individual pieces of the spacer, which causes the spacer to separate cleanly from the lug nut, allowing the lug nut to seat properly against the wheel mounting plate. That is, the adhesive and the material and configuration of the spacer are selected so that the spacer breaks cleanly away from the lug nut, and no spacer material remains between the lug nut and the mounting plate.

To facilitate breaking into pieces without leaving a portion of the spacer glued to the lug nut, the spacer may include impressions, weakened seams, indentations, perforations or another mechanism to facilitate breaking apart. The spacer may also be constructed from several pieces held together by plastic wrap, elastic bands, tape, or another suitable fastener. The spacer should also break cleanly from the wheel mounting plate, so that no pieces of the spacer remain attached to the race car as it exits the pit area.

Generally described, the invention includes a break-away lug nut positioner configured for attachment to a wheel. The wheel, which has a mounting plate with at least one mounting hole, is configured for mounting on a race car hub with a hub face. When the wheel is mounted on the hub with the mounting plate flush against the hub face, a mounting stud extends from the hub through the mounting hole. To facilitate threading a lug nut onto the stud, a spacer with a first edge attaches to a leading edge of the lug nut, and a second edge of the spacer attaches to the mounting plate. The spacer is configured so that the mounting stud protrudes into the spacer to a point adjacent to the lug nut. Each lug nut can then be easily installed on each threaded mounting stud by tightening the lug nut. As the lug nut is installed on the stud, the spacer breaks apart and separates from the lug nut and the wheel mounting plate.

To hold the lug nut on the spacer until the lug nut is tightened onto the mounting stud, a first layer of adhesive may be applied between the first edge of the spacer and the leading edge of the lug nut. Alternatively, a plastic layer, such as shrink-wrap or another type of plastic wrap, may partially encase the spacer and the lug nut to further hold the leading edge of the lug nut adjacent to the first edge of the spacer until the lug nut is tightened. In addition, the first layer of adhesive may be used in combination with the plastic layer to hold the lug nut to the spacer.

A second layer of adhesive holds the spacer to the mounting plate until the lug nut is tightened. Each layer of adhesive allows the clean separation of the spacer from the mounting plate and the lug nut when the lug nut is tightened. In particular, the first layer of adhesive and the spacer configuration are selected such that, as the lug nut is installed on the mounting stud, the first layer of adhesive yields before the spacer breaks apart so that the spacer separates completely from the lug nut as the lug nut is installed on the stud.

The present invention thus provides a break-away lug nut positioner for holding lug nuts on a race car wheel to facilitate more rapid tire changes during pit stops. Other objects, features, and advantages of the present invention will become apparent upon reading the following specification, when taken in conjunction with the drawings and the appended claims.

DETAILED DESCRIPTION OF ILLUSTRATIVE EMBODIMENTS

The invention may be embodied in a break-away lug nut positioner that holds a lug nut on a race car wheel to facilitate more rapid tire changes during pit stops. The break-away lug nut positioner includes a spacer that supports a lug nut at a proper distance over a mounting hole of a race car wheel. That is, the spacer holds the lug nut so that it is adjacent to a threaded mounting stud when the wheel is held flush against the race car hub. This prevents lug nuts poping off during installation, and thus speeds the installation of new tires during pit stops.

The spacer may be constructed from materials such as, but not limited to, expanded foam, styrofoam, plastic, or cork. The material should be easily shaped, machined, or molded into the appropriate dimensions. Specifically, a 2 pcf free rise density rigid foam expanded with water and HCFC 141b sold under the trade designation NP-14-8113 by Flexible Products Company of Marietta, Ga. has been used successfully used to manufacture the spacer by pour molding. The type of material may depend, however, on the method used to manufacture the spacer. In particular, injection molding may be an advantageous method for mass producing the spacers. In this case, the material should be amenable to injection molding and result in a spacer that breaks cleanly away from an attached lug nut during installation.

A frustoconical spacer works well, but the spacer may alternatively be any shape and size that both holds an attached lug nut in the proper position on a race car wheel and breaks cleanly away from the lug nut and the wheel mounting face during installation. A one-piece spacer also works well, but the spacer may alternatively be constructed of several pieces held together by glue, tape, shrink-wrap plastic, other types of plastic wrap, elastic bands, or another suitable retainer. For example, an injection-molded spacer may include several pieces held together by small tabs or bridges formed during the molding process to produce a spacer that easily breaks into a number of pieces. Impressions, weakened seams, slits, or perforations in or through the spacer may also facilitate the spacer breaking apart and cleanly away from the lug nut and the wheel mounting face during installation.

Lug nuts found on NASCAR race cars are typically used to practice the invention. Of course, lug nut postioners may be used wherever fast tire changes are advantageous, including any type of car racing, truck racing, motorcycle racing, and so forth. A high strength, surface insensitive, gel cyanoacylate adhesive marketed under the trade name PRONTO™ CA-50A is a suitable adhesive for attaching these lug nuts to an NP-14-8113 frustoconical spacer having the configuration shown in FIGS. 7A–B. Nevertheless, any other suitable adhesive can be used as long as the lug nut stays firmly attached to the spacer until time for installation, and breaks cleanly away from the spacer during installation. That is, the combination of the adhesive selected and the material and configuration of the spacer should allow the spacer to break cleanly from the lug nut so that portions of the spacer do not get trapped between the lug nut and the wheel mounting plate, which would interfere with proper seating of the lug nut. The spacer should also break cleanly from the wheel mounting plate, so that no pieces of the spacer remain attached to the race car as it exits the pit area.

The lug nut may also be attached to the spacer using plastic wrap, tape, or another suitable fastener. Any of these fasteners may be used alone or in combination with an adhesive. If plastic wrap or tape is used, spaced concentric ridges on the exterior surface of the spacer may also be used to further increase the ability of the plastic wrap or tape to hold the lug nut to the spacer.

Figures 1, 2, 3:
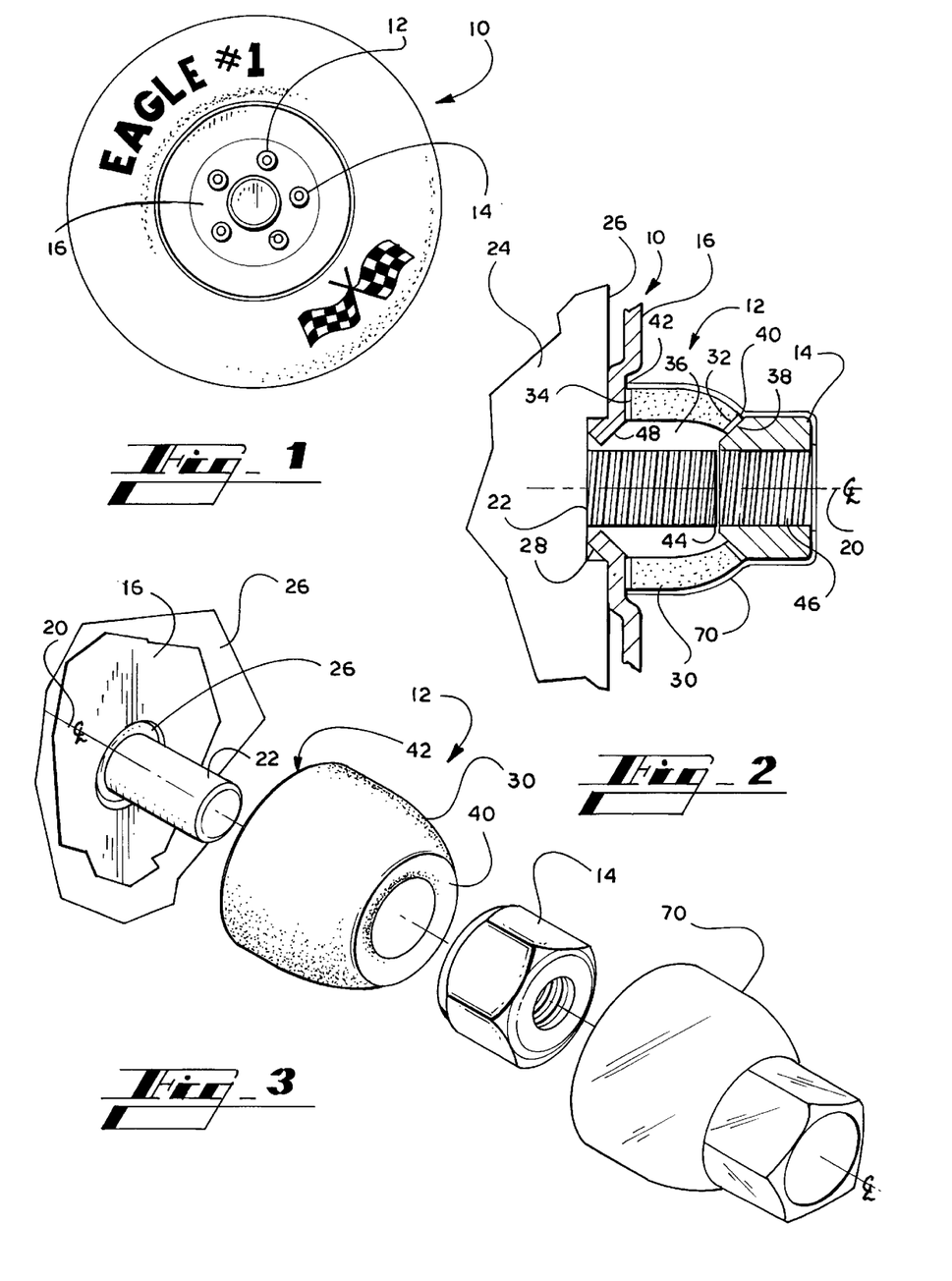
FIG. 1 is a front side view of a race car wheel including five break-away lug nut positioners with associated lug nuts attached to the wheel mounting plate.
FIG. 2 is a cross-sectional side view of a break-away lug nut positioner and associated lug nut attached to a wheel mounting plate.
FIG. 3 is an exploded view of a break-away lug nut positioner, lug nut, and plastic wrap axially aligned with a portion of a threaded mounting stud.

Turning now to the drawings, in which like numerals indicate like elements throughout the several views, FIG. 1 shows a race car wheel 10 carrying five break-away lug nut positioners 12 with associated lug nuts 14 is shown. Each break-away lug nut positioner 12 with associated lug nut 14 is axially aligned with a mounting hole of a mounting plate 16 on the race car wheel 10.

FIG. 2 is a side view of a break-away lug nut positioner 12 with an associated lug nut 14 mounted on the race car wheel 10. FIG. 3 is an exploded view of this same assembly. The break-away lug nut positioner 12 and lug nut 14 are axially aligned along the centerline 20 common to a threaded mounting stud 22 of a hub 24 defining a hub face 26, and common to a mounting hole 28 of a wheel mounting plate 16. This break-away lug nut positioner 12 includes a spacer 30 with two opposed edges, the first edge 32 diametrically smaller than the second edge 34, and a spacer cavity 36 therebetween.

A leading edge 38 of the lug nut 14 attaches to the first edge 32 of the spacer 30 with a first layer of adhesive 40. A second layer of adhesive 42 attaches the second edge 34 of the spacer 30 to the mounting plate 16 over the mounting hole 28. When the race car wheel 10 is installed on the hub face 26, a plurality of threaded mounting studs 22 protrude through a plurality of mounting holes 28 until the mounting plate 16 is flush against the hub face 26 as shown. The leading edge of the threads 44 of each mounting stud 22 extend into the spacer cavity 36 of the break-away lug nut positioner 12 to a position adjacent to the leading edge of the threads 46 of the lug nut 14. This position permits the lug nut 14 to be easily installed on the mounting stud 22.

A layer of plastic 70 may also hold the spacer 30 in axial alignment with the lug nut 14. The layer of plastic 70 can be used alone or in conjunction with the first layer of adhesive 40. The layer of plastic 70 partially encases both the spacer 30 and the lug nut 14. The layer of plastic 70 does not interfere with attaching the spacer 30 to the mounting plate 16, with aligning the spacer 30 with the lug nut 14, or with inserting the mounting stud 22 through the mounting hole 28 and into the spacer cavity 34. The layer of plastic 70 may be a shrink wrap plastic or any other plastic wrap that can hold the spacer 30 and lug nut 14 together, while still permitting the lug nut 14 to be tightened and the spacer 30 to be crushed. Furthermore, the layer of plastic 70 should fall away cleanly from the spacer 30 and the lug nut 14 when the lug nut 14 is tightened.

Prior to installing the race car tire assembly 10 onto the hub face 26, the break-away lug nut positioner 12 and lug nut 14 assembly is attached to the mounting plate 16. First, the spacer 30 and lug nut 14 are axially aligned with the mounting hole 28 along the centerline 20. Then, the spacer 30 is attached to the mounting plate 16 using a second layer of adhesive 42, such as the PRONTO™ CA-50A adhesive described above. To prepare a race car wheel for rapid installation, a break-away lug nut positioner 12 and associated lug nut 14 are attached to the mounting plate 16 over each mounting hole 28 of the race car wheel 10.

Figures 4, 5:
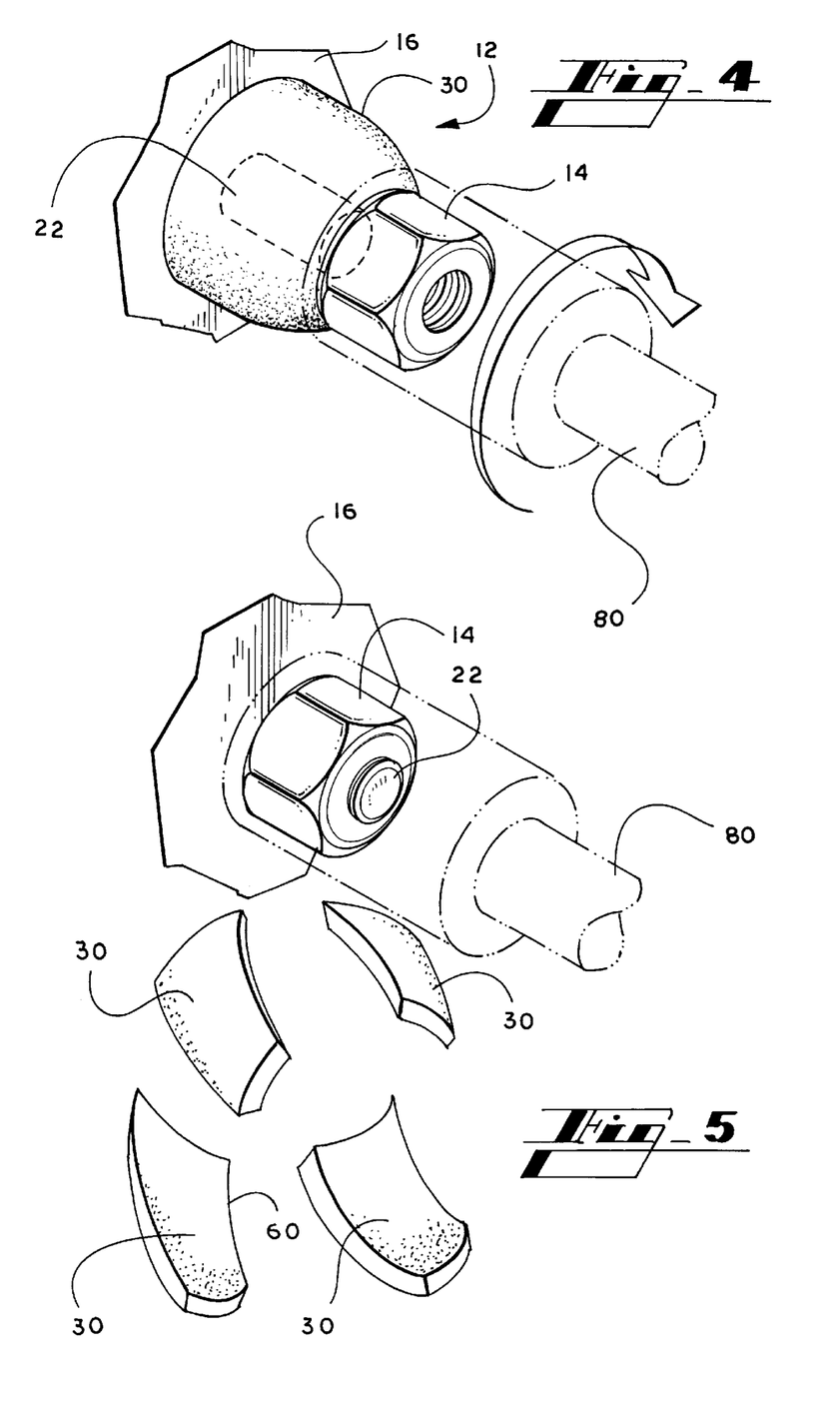
FIG. 4 is an isometric view of an assembled break-away lug nut positioner and associated lug nut attached to a mounting plate, with a ghost view of an air wrench tightening the lug nut onto a threaded mounting stud.
FIG. 5 is an isometric view of an installed lug nut, illustrating the breaking apart of a lug nut positioner as an associated lug nut is tightened onto a mounting stud.

When the race car wheel 10 is ready to be installed onto the hub face 26 of the race car, the mounting holes 28 on the mounting plate 16 are aligned with the threaded mounting studs 22 on the hub 24. Each mounting stud 22 protrudes through its respective mounting hole 28 of the mounting plate 16 into the spacer cavity 36 of the spacer 30 until the mounting plate 16 is flush against the hub face 26 (as shown best in FIG. 2). The threads 44 of each mounting stud 22 extend to a position adjacent to the threads 46 of the lug nut 14. In this context, "adjacent" to the lug nut means in direct contact with the lug nut, or spaced slightly apart from the lug nut, so long as the position permits the lug nut 14 to be easily threaded on the mounting stud 22 with a conventional air wrench 80 as shown in FIG. 4. Any conventional type of air wrench or other lug-nut-tightening tool can be used to tighten the lug nut.

Figure 6A:
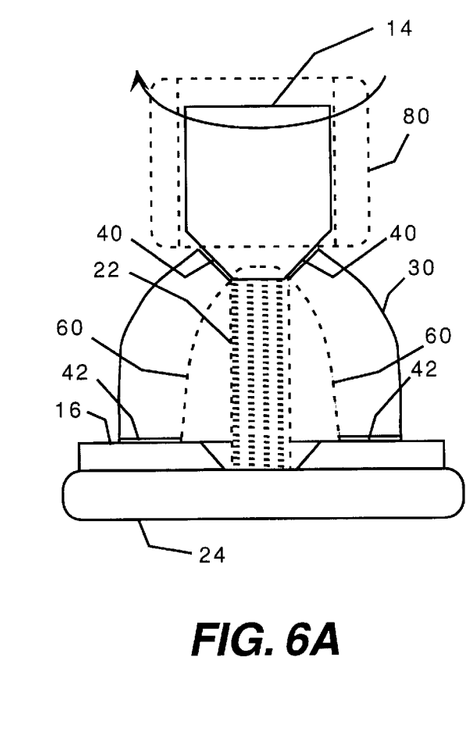
FIG. 6A is a side view of a break-away lug nut positioner with associated lug nut before the lug nut is tightened on an associated stud.
Figure 6B:
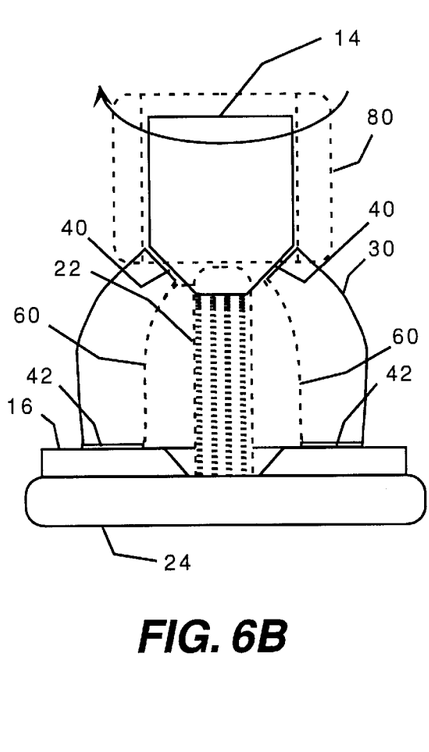
FIG. 6B is a side view of the break-away lug nut positioner of FIG. 6A during initial tightening of the lug nut onto the stud.
Figure 6C:
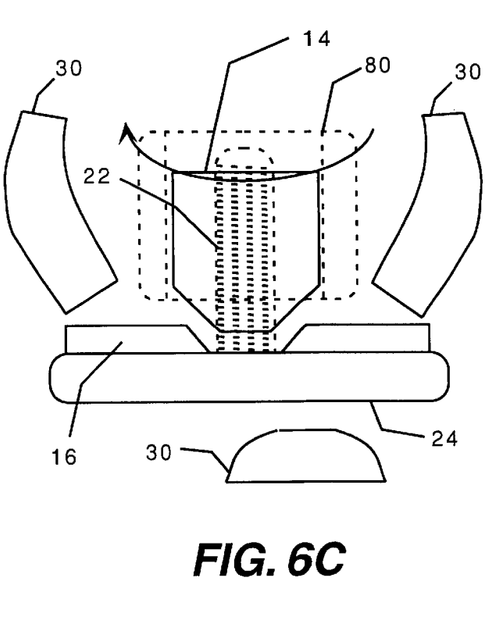
FIG. 6C is a side view of the break-away lug nut positioner of FIG. 6B during further tightening of the lug nut onto the stud.

FIGS. 4 and 5 illustrate the tightening of the lug nut 14 onto the mounting stud 22 with an air wrench 80. FIGS. 6A–C also illustrate this same process. As the lug nut 14 is tightened on the stud 22 with the air wrench 80, the bond of the first layer of adhesive 40, if present, and the bond of the second layer of adhesive 42 break cleanly, and the spacer breaks in to pieces that fall away from the race car.

As shown best in FIG. 6A, the first edge of the spacer 30 is beveled to match the bevel of the leading edge 38 of the lug nut 14, which in turn matches the bevel of the edge 48 around the mounting hole 26 of the mounting plate 16. The bevel also allows the lug nut to drive into the spacer cavity and force the spacer to break into pieces and disassemble radially outward. Turning to FIG. 6B, as the lug nut 14 is initially tightened, it compresses the spacer 30 against the wheel mounting plate 16 until the first layer of adhesive 40 between the lug nut 14 and the spacer 30 breaks cleanly. As the lug nut 14 is further tightened as shown in FIG. 7C, the lug nut 14 forces the spacer 30 to break into pieces and disassemble radially outward.

Figure 7A:
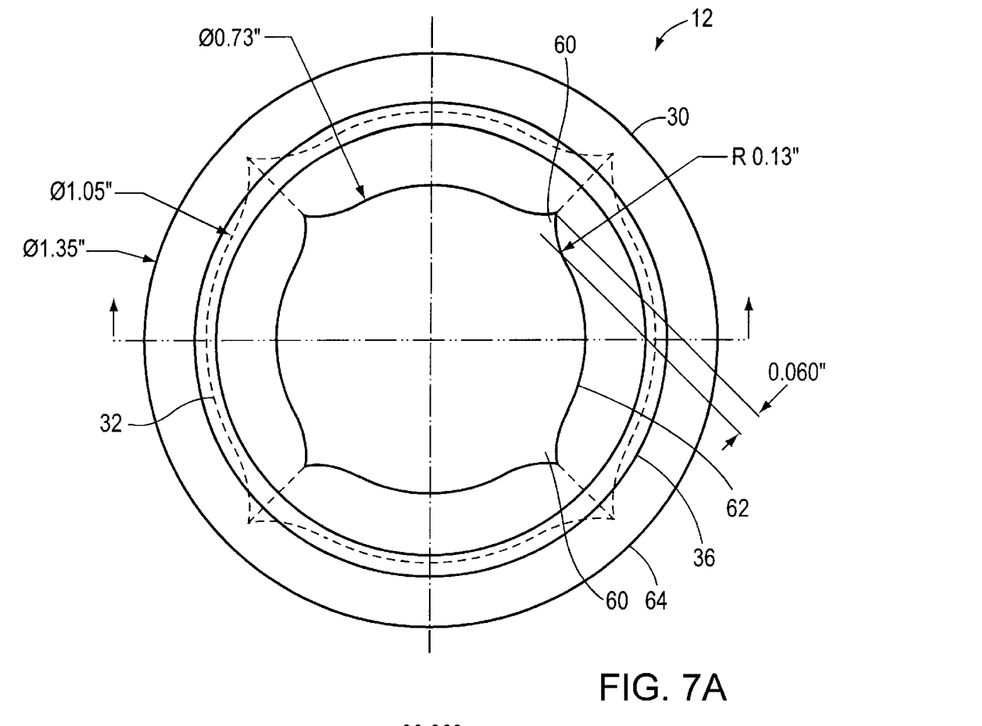
FIG. 7A is a top view of a break-away lug nut positioner showing manufacturing dimensions and detail.
Figure 7B:
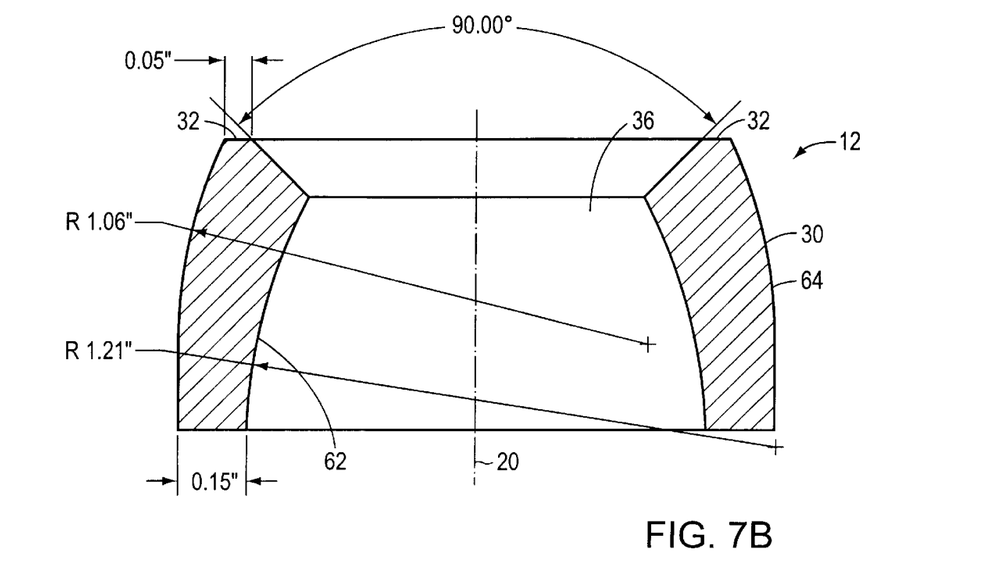
FIG. 7B is a side view of a break-away lug nut positioner showing manufacturing dimensions and detail.

FIGS. 7A and 7B illustrate the dimensions and the manufacturing details of an example frustoconical spacer. To assist in the ability of the spacer 30 to break apart and fall away cleanly from the lug nut 14, a spacer includes several impressions 60 on the interior surface 62 of the spacer 30. These impressions may be made while or after the spacer 30 is initially formed. Typically, an impression 60 in the interior surface 62 of the spacer 30 decreases the thickness of the spacer 30 in the area of the impression 60. For example, four impressions 60 may be spaced evenly about the interior surface 62 of the spacer 30. The impressions 60 extend axially along the spacer 30, as well as radially outward from the centerline 20 as the radius of the spacer increases.

The impressions 60 function as structural weaknesses in the material of the spacer 30. When the spacer 30 is subjected to sufficient radial pressure as the lug nut 14 drives into the cavity of the spacer, the initial material failure of the spacer 30 occurs along the impressions 60. Each impression 60 extends radially into the interior surface 62 of the spacer 30 towards the exterior surface 64 of the spacer 30. In his example, the depth of each impression 60 is 0.060 inches, measured radially outward from the centerline 20 of the spacer 30 between the interior diameter of the spacer 30 to the bottom of the impression 60. The depth of each impression 60 is uniform between the first edge 32 and the second edge 34 of the spacer 30, as the impression 60 extends axially parallel to the centerline 20 of the spacer 30 between the first edge 32 and second edge 34 of the spacer 30.

In this example, the impression 60 is shaped in the form of a V-shaped notch into the interior surface 62 of the spacer 30 away from the centerline 20 of the spacer 30. The V-shaped notch is formed by the intersection of a 0.13 inch radius extending from the interior surface 62 of the spacer 30 on both sides of the impression 60, and the radii intersecting at the bottom of the impression 60 to form the V-shaped notch of the impression 60.

In the top view of the spacer 30 shown in FIG. 7A, the interior diameter of the spacer 30 at the bottom of the inward bevel from the first edge 32 is 0.73 inches. The second edge 34 interior diameter of the spacer 30 measures 1.05 inches. The second edge 34 exterior diameter of the spacer 30 measures 1.35 inches. Additional manufacturing details are shown in the cross-sectional side view of the spacer 30 in FIG. 7B.

At the first edge 32 exterior diameter of the spacer 30 and 0.05 inches from the exterior surface 34 of the spacer 30, the bevel angle of the first edge 32 of the spacer 30 is 45 degrees inward towards the centerline 20 of the spacer cavity 36. The interior surface 62 of the spacer 30 is slightly concave towards the centerline 20 of the spacer 30, beginning at the bottom of the 45 degree bevel from the first edge 32 and extending towards the second edge 34 of the spacer 30 until the thickness of the spacer 30 at the second edge 34 is 0.15 inches.

The radius of the interior surface 62 from the bottom of the bevel of the first edge 32 to the second edge 34 of the spacer 30 measures 1.21 inches. The exterior surface 64 of the spacer 30 is slightly concave towards the centerline 20 of the spacer 30, beginning at the exterior diameter of the first edge 32 and extending to exterior diameter of the second edge 34 of the spacer 30. The radius of the exterior surface 64 from the outer diameter of the first edge 32 to the second edge 34 of the spacer 30 measures 1.06 inches.

Figure 8A:
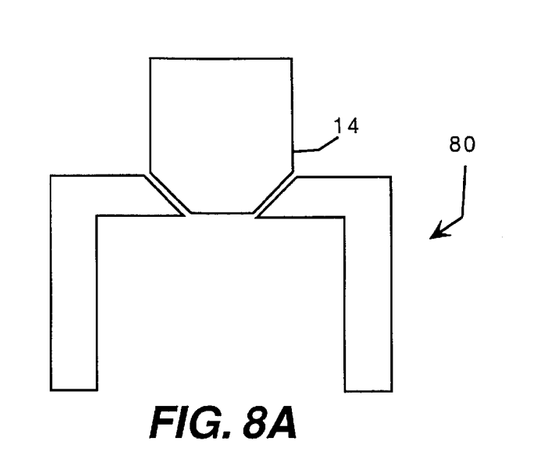
FIG. 8A is a side view of a break-away lug nut positioner including a cylindrical spacer.

FIG. 8A shows the side view of an alternative embodiment of a break-away lug nut positioner 81 with an associated lug nut 14. This embodiment is a two-piece spacer holding the lug nut 14 at a spaced-apart relation from the wheel. The break-away lug nut positioner 81 is cylindrical (L-shaped in cross section) and is attached to the lug nut 14 at a beveled end. The beveled ends of each piece of the break-away lug nut positioner 81 match the bevel angles of the lug nut 14.

Figure 8B:
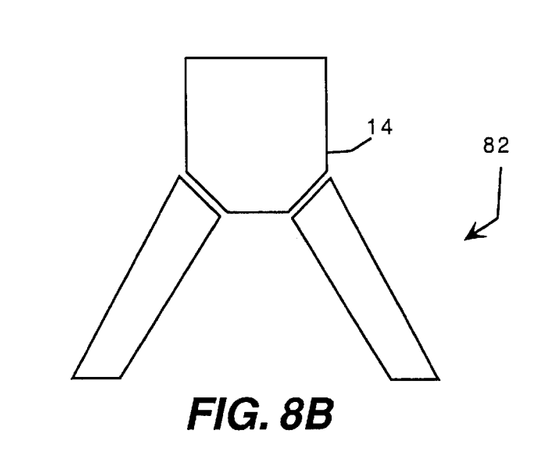
FIG. 8B is a side view of a break-away lug nut positioner including a spacer with an outer surface having a constant slope.
Figure 8C:
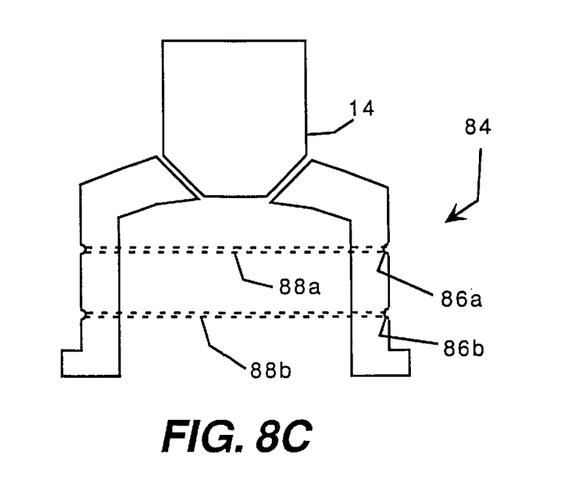
FIG. 8C is a side view of a multi-piece break-away lug nut positioner including elastic bands holding the pieces in place.
Figure 8D:
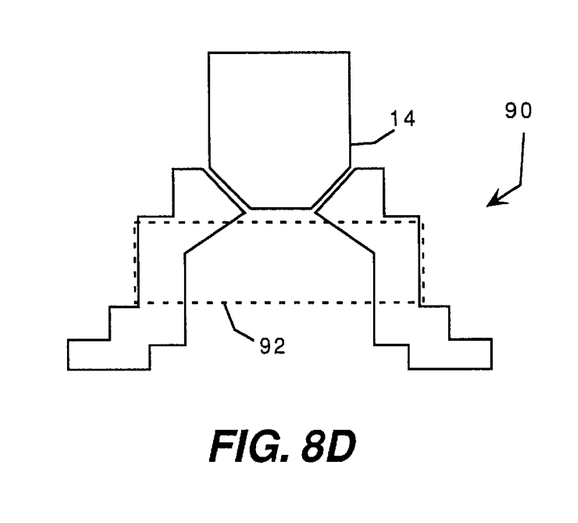
FIG. 8D is a side view of a multi-piece break-away lug nut positioner including tape holding the pieces in place.

FIGS. 8A–D show alternatives types of spacers that may be used to practice the present invention. FIG. 8A is a side view of a breal-away lug nut positioner including a cylindrical spacer 82 with an associated lug nut 14. FIG. 8B is a side view of a nut positioner including a spacer 82 having an outer surface having a constant slope. FIG. 8C shows a lug nut positioner including a multi-piece spacer 84 held together by elastic bands 88a–b. FIG. 8D shows a break-away lug nut positioner including a stair-step-shaped multi-piece spacer 90 held together by tape 92. The multi-piece spacers 84 and 90 may include two, three, four or more pieces.

It should be appreciated that after use of break-away lug nut positioner including a multi-piece spacer, the pieces of the spacer may be reused. The pieces of an injection-molded spacer that is initially held together by small bridges or tabs formed during the injection molding process may also be reused. For reuse in this case, the pieces may be held together by the adhesive or plastic wrap used to hold the spacer to the lug nut, without having to glue or otherwise attach the individual pieces to each other.

Given the preceding examples, those skilled in the art will appreciate that many other spacer configurations may be employed to practice the present invention. It will also be understood that throughout this specification the invention has been disclosed by way of example, and that other modifications may occur to those skilled in the art without departing from the scope and spirit of the invention defined by the following claims.

What is claimed is:

1. A break-away lug nut positioner for rapid race car tire changes configured for attachment to a wheel having a mounting plate with at least one mounting hole, the wheel configured for receipt on a hub defining a hub face, the hub including at least one threaded stud that extends through the mounting hole when the wheel is received on the hub with the mounting plate flush against the hub face, the stud defining threads for engaging the threads of a lug nut, comprising:

a spacer defining a first edge configured for attachment to the lug nut and a second edge configured for attachment to the wheel mounting plate;

the spacer further defining a cavity configured such that, when the wheel is received on the hub with the mounting plate flush against the hub face with the stud extending through the mounting hole and the lug nut is adjacent to the first edge of the spacer and the second edge of the spacer is adjacent to the wheel mounting face with the lug nut aligned with the mounting hole, the stud extends into the spacer cavity and the threads of the stud are positioned adjacent to the threads of the lug nut for easy installation of the lug nut on the stud; and the spacer further configured to break apart and separate from the lug nut as the lug nut is installed on the stud.

2. The break-away lug nut positioner of claim 1, further comprising a first layer of adhesive between the first edge of the spacer and a leading edge of the lug nut firmly attaching the lug nut to the first edge of the spacer until the lug nut is installed on the stud.

3. The break-away lug nut positioner of claim 1, further comprising a layer of plastic partially encasing the spacer and the lug nut firmly holding a leading edge of the lug nut adjacent to the first edge of the spacer until the lug nut is installed on the stud.

4. The break-away lug nut positioner of claim 2, further comprising a layer of plastic partially encasing the spacer and the lug nut.

5. The break-away lug nut positioner of claim 2, wherein the first layer of adhesive allows the spacer to separate completely from the lug nut as the lug nut is installed on the stud.

6. The break-away lug nut positioner of claim 2, wherein the first layer of adhesive and the spacer configuration are selected such that, as the lug nut is installed on the stud, the first layer of adhesive yields before the spacer breaks apart so that the spacer separates completely from the lug nut as the lug nut is installed on the stud.

7. The break-away lug nut positioner of claim 2, further comprising a second layer of adhesive between the second edge of the spacer and the wheel mounting plate firmly attaching the lug nut to the spacer until the lug nut is installed on the stud.

8. The break-away lug nut positioner of claim 7, wherein the second layer of adhesive allows the spacer to separate completely from the wheel mounting plate as the lug nut is installed on the stud.

9. The break-away lug nut positioner of claim 4, further comprising a layer of adhesive between the second edge of the spacer until the lug nut is installed on the stud.

10. The break-away lug nut positioner of claim 1, wherein:

the spacer defines a conical section connecting the first and second edges;

the first edge defines an approximately circular ring with a first inner diameter;

the second edge defines an approximately circular ring with a second inner diameter; and the first inner diameter is less than the second inner diameter.

11. The break-away lug nut positioner of claim 10, wherein the approximately circular ring defined by the first edge tapers to conform to a tapered leading edge of the lug nut.

12. The break-away lug nut positioner of claim 10, wherein the spacer further defines one or more impressions to facilitate breaking apart of the spacer as the lug nut is installed on the stud.

13. A wheel adapted for easy installation on a race car, comprising:

a mounting plate with a plurality of mounting holes, the mounting plate configured for receipt on a hub defining a hub face and a plurality of studs such that one of the studs extends through one of the mounting holes when the wheel is received on the hub with the mounting plate flush against the hub face; and a break-away lug nut positioner attached to the mounting plate near each mounting hole;

each break-away lug nut positioner comprising a spacer defining a first edge attached to a lug nut and a second edge attached to the wheel mounting plate and a cavity configured such that, when the wheel is received on the hub with the mounting face flush against the hub face with one of the studs extends through the mounting hole and the stud extends into the spacer cavity so that the threads of the stud are positioned adjacent to the threads of the lug nut for easy installation of the lug nut on the stud; and each spacer is configured to break apart and separate from its associated lug nut as the lug nut is installed on a corresponding one of the studs.

14. The wheel of claim 13, further comprising a first layer of adhesive between the first edge of the spacer and a leading edge of the lug nut firmly attaching the lug nut to the first edge of the spacer until the lug nut is installed on the stud.

15. The wheel of claim 13, further comprising a layer of plastic partially encasing the spacer and the lug nut firmly holding a leading edge of the lug nut adjacent to the first edge of the spacer until the lug nut is installed on the stud.

16. The wheel of claim 14, further comprising a layer of plastic partially encasing the spacer and the lug nut.

17. The wheel of claim 14, wherein the first layer of adhesive allows the spacer to separate completely from the lug nut as the lug nut is installed on the stud.

18. The wheel of claim 14, wherein the first layer of adhesive and the spacer configuration are selected such that, as the lug nut is installed on the stud, the first layer of adhesive yields before the spacer breaks apart so that the spacer separates completely from the lug nut as the lug nut is installed on the stud.

19. The wheel of claim 13, further comprising a second layer of adhesive between the second edge of the spacer and the wheel mounting plate firmly attaching the lug nut to the spacer until the lug nut is installed on the stud.

20. The wheel of claim 19, wherein the second layer of adhesive allows the spacer to separate completely from the wheel mounting plate as the lug nut is installed on the stud.

21. The wheel of claim 16, further comprising a layer of adhesive between the second edge of the spacer mounting plate firmly attaching the lug nut to the spacer until the lug nut is installed on the stud.

22. A method for rapidly installing a race car wheel having a wheel mounting plate with at least one mounting hole, comprising the steps of:

preparing a spacer having a first edge and a second edge with a spacer cavity therebetween;

attaching the leading edge of a lug nut to the first edge of the spacer; and attaching the second edge of the spacer to the wheel mounting plate in alignment with a mounting hole such that the lug nut is axially aligned with the mounting hole.

23. The method of claim 22 comprising the additional step of:

installing the wheel mounting plate on a race car hub defining a hub face with at least one threaded mounting stud protruding from the hub face and through the mounting hole until the wheel mounting plate is flush with the hub face and the mounting stud extends into the spacer cavity to a position adjacent to first threads of the lug nut; and tightening the lug nut onto the mounting stud such that the spacer is removed from the lug nut.

24. The method of claim 22 comprising the additional step of applying a first layer of adhesive between the first edge of the spacer and the leading edge of the lug nut.

25. The method of claim 22 comprising the additional step of encasing the lug nut and the spacer with a plastic layer holding the leading edge of the lug nut to the first edge of the spacer.

26. The wheel of claim 13, further comprising a layer of adhesive between a portion of the layer of plastic adjacent to the second edge of the spacer and the wheel mounting plate firmly attaching the lug nut to the spacer until the lug nut is installed on the stud.

27. The wheel of claim 16, further comprising a layer of adhesive between a portion of the layer of plastic adjacent to the second edge of the spacer and the wheel mounting plate firmly attaching the lug nut to the spacer until the lug nut is installed on the stud.

* * * * *